United States Patent
Fan et al.

(10) Patent No.: US 7,907,786 B2
(45) Date of Patent: *Mar. 15, 2011

(54) RED-EYE DETECTION AND CORRECTION

(75) Inventors: Lixin Fan, Tampere (FI); Jutta K. Willamowski, Grenoble (FR); Christopher R. Dance, Meylan (FR)

(73) Assignee: Xerox Corporation, Norwalk, CT (US)

( * ) Notice: Subject to any disclaimer, the term of this patent is extended or adjusted under 35 U.S.C. 154(b) by 693 days.

This patent is subject to a terminal disclaimer.

(21) Appl. No.: 11/145,710

(22) Filed: Jun. 6, 2005

(65) Prior Publication Data

US 2006/0274950 A1    Dec. 7, 2006

(51) Int. Cl.
*G06K 9/40* (2006.01)

(52) U.S. Cl. ........ 382/254; 382/275; 382/167; 382/190; 382/103; 348/246; 348/576; 348/577; 348/78

(58) Field of Classification Search .................. 382/117, 382/118, 190, 167, 160, 165, 194, 225, 228; 348/246, 576, 577, 78
See application file for complete search history.

(56) References Cited

U.S. PATENT DOCUMENTS

| | | | |
|---|---|---|---|
| 5,130,789 A | 7/1992 | Dobbs et al. | |
| 5,153,632 A | 10/1992 | Maida et al. | |
| 5,202,719 A | 4/1993 | Taniguchi et al. | |
| 5,404,192 A | 4/1995 | Konishi et al. | |
| 5,432,863 A | 7/1995 | Benati et al. | |
| 5,801,943 A | 9/1998 | Nasburg | |
| 5,852,675 A * | 12/1998 | Matsuo et al. | 382/167 |
| 5,990,973 A * | 11/1999 | Sakamoto | 348/576 |
| 6,009,209 A | 12/1999 | Acker et al. | |
| 6,016,354 A | 1/2000 | Lin et al. | |

(Continued)

FOREIGN PATENT DOCUMENTS

EP     1480168 A2 *  11/2004

(Continued)

OTHER PUBLICATIONS

Lei Zhang; Yanfeng Sun; Mingjing Li; Hongjiang Zhang; Automated red-eye detection and correction in digital photographs Image Processing, 2004. ICIP '04. 2004 International Conference on Oct. 24-27, 2004 vol. 4 pp. 2363-2366.*

(Continued)

*Primary Examiner* — Vikkram Bali
*Assistant Examiner* — Julian D Brooks
(74) *Attorney, Agent, or Firm* — Fay Sharpe LLP

(57) ABSTRACT

A method suited to the detection and correction of red-eyes includes assigning a probability to pixels of a digital image of the pixel being in a red-eye, the probability being a function of a color of the pixel. Optionally, generally circular regions in the image of contiguous pixels which satisfy at least one test for a red-eye are identified. The test may include determining a size or shape of the region or an extent of overlap with a region comprising pixels having at least a threshold probability of being in a red-eye. For each of a plurality of the pixels, such as simply those in identified regions, or for all pixels or a larger group of the pixels, a color correction for the pixel is determined. The correction is a function of the assigned probability that the pixel is within a red-eye and a color of the pixel.

24 Claims, 4 Drawing Sheets

U.S. PATENT DOCUMENTS

| | | | |
|---|---|---|---|
| 6,252,976 B1 * | 6/2001 | Schildkraut et al. | 382/117 |
| 6,278,491 B1 | 8/2001 | Wang et al. | |
| 6,285,410 B1 * | 9/2001 | Marni | 348/576 |
| 6,304,858 B1 * | 10/2001 | Mosler et al. | 705/37 |
| 6,577,751 B2 | 6/2003 | Yamamoto | |
| 6,718,051 B1 | 4/2004 | Eschbach | |
| 6,728,401 B1 | 4/2004 | Hardeberg | |
| 6,980,691 B2 | 12/2005 | Nesterov et al. | |
| 7,171,044 B2 * | 1/2007 | Chen et al. | 382/165 |
| 7,343,028 B2 | 3/2008 | Ioffe et al. | |
| 2002/0126893 A1 * | 9/2002 | Held et al. | 382/167 |
| 2002/0136450 A1 | 9/2002 | Chen et al. | |
| 2002/0150292 A1 * | 10/2002 | O'Callaghan | 382/167 |
| 2002/0176623 A1 | 11/2002 | Steinberg | |
| 2003/0044178 A1 | 3/2003 | Oberhardt et al. | |
| 2003/0142285 A1 | 7/2003 | Enomoto | |
| 2003/0202105 A1 | 10/2003 | Gaubatz et al. | |
| 2004/0114829 A1 * | 6/2004 | LeFeuvre et al. | 382/275 |
| 2004/0184670 A1 | 9/2004 | Jarman et al. | |
| 2004/0213476 A1 * | 10/2004 | Luo et al. | 382/254 |
| 2004/0228542 A1 | 11/2004 | Zhang et al. | |
| 2004/0240747 A1 * | 12/2004 | Jarman et al. | 382/274 |
| 2005/0047655 A1 | 3/2005 | Luo et al. | |
| 2005/0117173 A1 * | 6/2005 | Kugo | 358/1.1 |
| 2005/0226499 A1 * | 10/2005 | Terakawa | 382/165 |
| 2005/0232481 A1 | 10/2005 | Wu | |
| 2006/0056687 A1 * | 3/2006 | Brandt | 382/167 |
| 2006/0072815 A1 * | 4/2006 | Wu et al. | 382/167 |
| 2006/0098867 A1 | 5/2006 | Gallagher | |
| 2006/0120599 A1 | 6/2006 | Steinberg et al. | |
| 2007/0116380 A1 * | 5/2007 | Ciuc et al. | 382/275 |

FOREIGN PATENT DOCUMENTS

| | | |
|---|---|---|
| WO | WO 9917254 A1 * | 4/1999 |

OTHER PUBLICATIONS

Willamowski, J.; Csurka, G.; Probabilistic Automatic Red Eye Detection and Correction Pattern Recognition, 2006. ICPR 2006. 18th International Conference. vol. 3, pp. 762-765.*

Ioffe, S.; Red eye detection with machine learning. Image Processing, 2003. ICIP 2003. Proceedings. 2003 International Conference on Sep. 14-17 vol. 2, 2003 pp. II-871-874.*

Sergey Ioffe, *Red Eye Detection With Machine Learning*, ICIP 2003.

B. Smolka et al, *Towards Automatic Redeye Effect Removal*, Pattern Recognition Letters, 24 (2003) 1767-1785.

*Red-Eye Correction: Using Point to Point*, www.jasc.com/support/learn/tutorials/archive/paintshoppro/red-eye2.asp?pg=1 (Feb. 4, 2005).

Remove "Red-Eye" *Effect From Your Images*, www.vicman.net/redeye (Feb. 4, 2005).

J.Y. Hardeberg, Digital Red Eye Removal, *Journal of Imaging Science and Technology*, vol. 46(4) pp. 375-381 (2002).

B. Smolka, et al., Towards Automatic Redeye Effect Removal, *Pattern Recognition Letters*, vol. 24(11) pp. 1767-1785 (2003).

R.Schettini, et al., A Modular Procedure for Automatic Redeye Correction in Digital Photos, *ICIP*, 2003.

Burges, A Tutorial on Support Vector Machines for Pattern Recognition, *Data Mining and Knowledge Discovery*, vol. 2, No. 2, pp. 121-167 (Kluwer Academic Publishers) 1998.

Calvo, et al., A Comparative Study of Principal Component Analysis Techniques, *Australian Conference in Neural Networks*, Brisbane (1998).

Chuat, Generic Visual Categorizer, *Xerox Research Centre Europe*, licensing@xrce.xerox.com., Apr. 2006.

Csurka, et al., Visual Categorization with Bags of Keypoints, *Xerox Research Centre Europe*, 2004.

U.S. Appl. No. 11/311,991, filed Dec. 2005, Willamowski, et al.

U.S. Appl. No. 11/637,351, filed Dec. 2006, Marchesotti, et al.

DeLaTorre, et al., Robust Principal Component Analysis for Computer Vision, *Intl. Conf. on Computer Vision* (2001).

Delphi3D, Phong for Dummies, http://www.delphi3d.net/articles/viewarticle.php?article=phong.htm, 2006.

Duch, et al., Distance-based Multilayer Perceptrons, *CIMCA*, pp. 75-80 (ed. M. Mohammadian, IOS Press, Amsterdam) (1999).

Gaubatz, et al., Automatic Red-Eye Detection and Correction, *IEEE ICIP*, 2002, pp. 804-807.

Mikolajczyk, et al., A Performance Evaluation of Local Descriptors, *IEEE Conf. on Pattern Analysis and Machine Intelligence*, vol. 27, No. 10 Oct. 2005.

Omachi, et al., A Fast Algorithm for a k-NN Classifier Based on Branch and Bound Method and Computational Quanity Estimation, *In Systems and Computers in Japan*, vol. 31, No. 6, pp. 1-9 (2000).

PHONG Model for Specular Reflection, *PHONG Model—Specular Reflection*, http://www.siggraph.org/ed ucation/materials/HyperGraph/illumin/specular_Highlights/phong (2006).

PIRES, Robust Linear Discriminant Analysis and the Projection Pursuit Approach—Pratical Aspects Developments in Robust Statistics, *Intl. Conf. on Robust Statistics*, Heidelberg 2001, pp. 317-329 (Springer-Verlag 2003).

Povinelli, et al., Time Series Classification Using Gaussian Mixture Models of Reconstructed Phase Spaces, *IEEE Transaction on Knowledge and Data Engineering*, vol. 16, No. 6, Jun. 2004, pp. 779-783.

Singh, et al., Nearest Neighbour Strategies for Image Understanding, *Proc. Workshop on Advanced Concepts for Intelligent Visions Systems* (ACIVZ '99), Baden-Baden, (Aug. 2-7, 1999).

Smith, et al., VisualSEEK: A Fully Automated Content-Based Image Query System, *ACM Multimedia*, 1996.

Ulichney, Perceptual-Based Correction of Photo Red-Eye, *Proc. of the 7th IASTED Intl. Conf. on Signal and Image Processing*, Honolulu, HI, Aug. 2005.

* cited by examiner

RED-EYE DETECTION AND CORRECTION

BACKGROUND

The present exemplary embodiment relates to image processing. It finds particular application in connection with the automated correction of digital images for red-eye.

Red-eye is a common problem in photographic images. It occurs whenever a flash is used and the light reflecting from the human retina makes the eyes appear red instead of their natural color. Recognizing this problem, camera manufacturers have attempted to minimize or inhibit red-eye by equipping cameras with the ability to emit one or more pre-flashes of light immediately prior to completion of the actual photograph. These pre-flashes are intended to constrict the subject's pupils to minimize light incident on the retina and reflected therefrom. Although cameras equipped with pre-flash hardware can alleviate red-eye problems, they are not always well received since the red-eye artifact is not always prevented. They also tend to consume much more energy, induce a significant delay between pushing the button and taking the photograph, and result in people blinking the eyes. Red-eye has become more prevalent and severe as cameras have been made smaller with integrated flashes. The small size coupled with the built-in nature of the flash requires placement of the flash in close proximity to the objective lens. Thus, a greater portion of the reflected light from a subject's retinas enters the object lens and is recorded.

Techniques have been developed for the detection and correction of red-eye in images. In one method, an operator visually scans all images and marks those images including red-eye for further processing. The processing typically involves modifying the red pixels in the identified red-eye. Efforts to eliminate or reduce operator involvement have resulted in automated processes that attempt to detect red-eye based upon color, size, and shape criteria. When a red-eye is detected, the automated process applies a correction to the red area. Given that the color red is very common, and that red-eye is not present in a great many images (e.g., those not taken using a flash, those not including human subjects, etc.), false-positives are common. Thus, red buttons, a piece of red candy, and the like, may all be misidentified as red-eye using such automated red-eye detection techniques. Methods for recognizing or addressing red-eye are disclosed, for example, in U.S. Pat. Nos. 5,990,973, 6,718,051, and the references cited therein, the disclosures of which are hereby expressly incorporated in their entireties by reference. Other red-eye detection methods rely on face detection or learning, as disclosed, for example, in U.S. Pat. Nos. 6,009,209, 6,278,491, and 6,278,401, the disclosures of which are hereby expressly incorporated in their entireties by reference.

BRIEF DESCRIPTION

Aspects of the present exemplary embodiment relate to a digital image processing method and a system. For each of a plurality of pixels of a digital image, the method includes assigning a probability to the pixel of the pixel being in a red-eye as a function of a color of the pixel. For each of the plurality of pixels, a correction to apply to the pixel is determined. The correction is a function of the assigned probability that the pixel is within a red-eye and a color of the pixel.

Optionally, any regions in the image of contiguous pixels which satisfy at least one test for a red-eye are identified. The at least one test relates to one of the group consisting of a size of the region, a shape of the region, and an extent of overlap with a region comprising pixels having at least a threshold probability of being in a red-eye.

In another aspect, a system for correction of images includes a detection module which, for a plurality of pixels in a digital image, assigns a probability that a pixel is within a red-eye, the probability having a value which is variable from a minimum value to maximum value. A correction module assigns a correction to apply to the pixel, the correction being a function of the assigned probability and of a color of the pixel.

In another aspect, a system for processing digital images includes a first component which assigns a probability to each of a plurality of pixels in a digital image that the pixel is in a red-eye. The probability is a function of a color of the pixel. A second component assigns a circularity probability to each of a plurality of the pixels. Optionally, a third component evaluates regions of the image for which the pixels have a minimum circularity probability to determine if the region meets at least one test that the region is within a red-eye. A fourth component determines a correction to be applied to pixels in the image based on the assigned redness probability and color of the pixel.

In another aspect, a digital image processing method includes, for each of a plurality of pixels in a digital image, automatically assigning a probability to the pixel of the pixel being in a red-eye as a function of a color of the pixel and automatically determining a correction to apply to at least a portion of the pixels in the image which, for each of the pixels, is a function of the assigned probability that the pixel is within a red-eye and a color of the pixel.

DETAILED DESCRIPTION

Aspects of the present exemplary embodiment relate to a system and method for addressing red-eye in digital images. The system enables fully automated detection and correction of red-eyes in the image processing stage, allowing the elimination of pre-flash hardware and its associated disadvantages. The images to be processed may be generated by a digital imaging device, such as digital camera, scanner, digital video recorder, or the like. An exemplary detection and correction system includes a processing module which includes software which may be incorporated into the digital imaging device or may be stored on a suitable image processing apparatus separate from the digital imaging device, such as a personal desktop computer, laptop, or a dedicated image processing system, such as a photofinishing apparatus. The images to be processed are in digital form or are converted to digital form prior to processing. The image data can be defined by a plurality of pixel values expressed in terms of a color space, such as a red, green, blue (RGB) color space, or may be converted thereto.

An exemplary method for treatment of red-eye in a digital image consists of a fuzzy (soft) red-eye detection step and a fuzzy (soft) red-eye correction step. Thus, instead of making a hard (yes or no) decision about whether a pixel is in a red-eye, a value is assigned to each pixel which generally corresponds to the likelihood that it is in a red-eye and the correction process involves a soft correction where each pixel to be corrected is corrected according to its individual probability.

Figure 1:
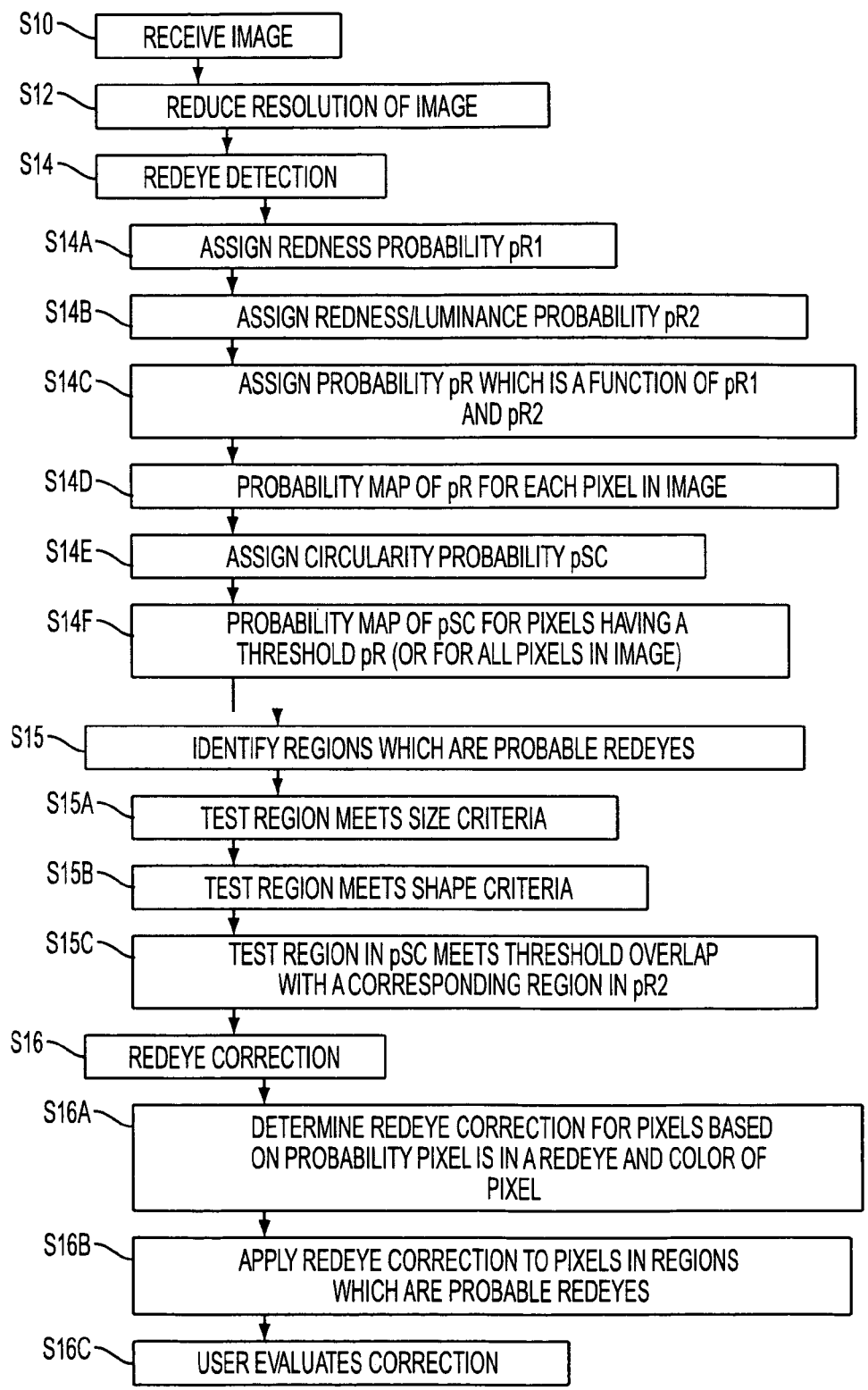
FIG. 1 is a flow diagram illustrating steps in an exemplary method for automatic correction of red-eye in an image.

The elements of an exemplary method are illustrated in FIG. 1. The method begins with receipt of an image by the image processing apparatus (Step S10). The image may be stored on a disk, such as a DVD, CDROM, or floppy disk, or on other image storing medium and temporarily transferred to a memory of the image processing apparatus for processing.

Prior to performing the red-eye detection, the resolution of the image can be reduced to a standardized number of pixels, such as 1 megapixel, to reduce the number of processing steps (Step S12). In the fuzzy detection step (S14), a detection module of the system evaluates pixels of the digital image based on one or more color and spatial characteristics of the pixel. In evaluating the color, the detection module may consider the redness and luminance (brightness) of the pixel, assigning probability values for one or both of these and/or a combined probability (substeps S14A, S14B, S14C, S14D). Taking into account the relation between redness and luminance allows the elimination (by assignment of a low probability) of a large proportion of false positives, such as skin and faces, that are more bright than red, whereas red eyes are usually more red than bright. Evaluation of the spatial characteristic (spatial circularity) (substep S14E) may include assigning a probability to the pixel related to the circularity of a region surrounding the pixel. The probability assigned in step S14E may be normalized over the probabilities obtained for the entire image.

As an alternative to luminance, some other characteristic commonly associated with red-eyes can be evaluated, such as local contrast (whether the pixel is in a region adjacent one of contrasting color and/or brightness).

In aspects of the present embodiment, a redness probability pR1 and a redness/luminance probability pR2 are determined as a way to focus on the most probable red-eye regions of an image (substeps S14A and S14B). The redness/luminance probability pR2 can incorporate the redness probability pR1 determined in step S14A. A combined probability pR, which is some function of the probabilities pR1 and pR2 can be determined to identify regions which have at least a minimum probability of being a red-eye, in view of their color and luminance. (substep S14C). The output is a probability map of pR for all pixels in the image (substep S14D). A circularity probability (pSC) for pixels of regions identified through the pR3 values of the pixels is then determined and assigned to each pixel, which may be based on the principle that, in practice, a probable red eye region is surrounded by an improbable one (substep S14E). Further tests may then be applied to the remaining probable red-eye regions to eliminate false positives (pSC+tests) (substeps S15A and S15B). Further tests may be applied to all the remaining prospective red eye regions to eliminate even more false positives. For the remaining regions, probability values, such as pR2 values are then used to modify (reduce) the red components of the prospective red eyes (step S16). This step includes determining the red-eye correction to be applied (substep S16A) and correcting for red-eyes (substep 16B), for example, by blending the original image with a "red reduced" image. pR2 better reflects the probability and amount of redness by which to reduce the pixel red component than pR1 or pR, although it is contemplated that these probability values may be used in the correction step.

In the exemplary embodiment, all or a preponderance of the pixels in the image are evaluated for the three features: redness probability (pR1) (substep S14A), redness/luminance probability (pR2) (substep S14B) and circularity probability (pSC) (substep S14C), although it is also contemplated that the detection step may not involve calculating each probability pR1, pR2, an pSC for every pixel. For example, for regions or for individual pixels in which pR1 and/or pR2 are below a minimum threshold, i.e., low or zero (i.e., suggesting a low probability of a red eye), pSC may not need to be calculated. The output of step S14 may be a probability map that indicates, for each pixel evaluated, the probability (P) of the pixel being in a red-eye (Substep S14F). Based on this probability map, regions with a high probability of being a red eye are identified (step S15), and a subsequent correction step modifies the color of each pixel in these regions individually (Step S16). As a result, a correction applied to one pixel in a red-eye may differ from the correction applied to another pixel in the red-eye.

At each step, scaling (e.g., normalization) can be performed such that for an image in which any pixel has a value greater than 0, the maximum value over the whole image becomes 1. Scaling can be achieved by dividing by the maximum value, but other non linear ways of scaling are also contemplated. Each subsequent processing substep (S14B, S14C, S14D, S14E) may rely on and improve the output of the preceding one.

For an image in which a red-eye occurs, the probability map generated in step S14E is not binary but includes values from 0 and 1 (or other assigned maximum and minimum values), where 0 indicates the lowest probability that the pixel is in a red-eye and 1 indicates the highest probability that the pixel is in a red-eye. The values between 0 and 1 can be graphically represented as gray levels, with black corresponding to 0 and white corresponding to 1. As discussed above, this probability can be a combination of one or more different pixel features, such as color attributes (e.g., redness), luminance, and spatial circularity The color (redness probability) pR1 of the pixel (Step 14A) can be determined from a measure of the red component of the pixel and may include comparing the red component with complimentary color components, such as green and blue components of the pixel's color space. Depending on the color scale used, the color components can be expressed as numerical values, the higher the value, the greater the saturation. For example, in RGB color space, the color of a pixel is defined in terms of red, green, and blue components each being assigned a numerical value of, for example, from 0-255. The redness probability can take into account each of these values or just the red component. In one embodiment the extent to which a pixel is "reddish" (D) is determined by subtracting an average of the green (G) and blue (B) values from the red value (R) of the pixel, using the expression:

$$\text{Reddish } (D) = R - (G+B)/2 \qquad \text{Eqn. 1}$$

The redness probability (pR1) of a pixel being red can be obtained by scaling the reddish value obtained according to Eqn. 1, e.g., by dividing the reddish value (D) by the maximum reddish value ($D_{max}$) for the image and taking the maximum of this value and zero to eliminate negative values, which can be expressed as follows:

$$pR1 = \max(0, D/D_{max}) \qquad \text{Eqn. 2}$$

For example, for a pixel having the following values R=220, G=130, B=90, $$D = 220 - [(130+90)/2] = 110$$

If the maximum reddish value $D_{max}$ of the image is 220, $$pR1=\max(0, 110/220), \text{ in this case, } pR1=0.5$$

The output of substep S14A is thus a probability pR1, which is assigned to each pixel which equates to some relative measure of its redness. In the illustrated embodiment, the probability pR1 is a measure of the extent to which the pixel is more red than it is green and blue. Other color measures which are tailored to identify the degree to which a pixel is similar in color to a red-eye are also contemplated. It will be appreciated that pR1 need not be a scaled value of D, for example, pR1 may be equal to D, or some other function of D.

The next substep (S14B) assigns a redness/luminance probability (pR2) to each pixel. The luminance (or brightness) of a pixel can be expressed in terms of the gray level (saturation) of the pixel. Thus, for example, a luminance or gray level (V) is determined for each pixel which is a weighted sum of the values for red, green, and blue. In one embodiment, the gray level is determined using the expression:

$$V=0.25*R+0.6*G+0.15*B \qquad \text{Eqn. 3}$$

* being the multiplication function. The redness/luminance value (L) is then determined by subtracting the gray level from a function of the reddish value D, determined in Eqn. 1. In one embodiment, the function is 2D, as follows:

$$L=2*D-V \qquad \text{Eqn. 4}$$

L can be normalized by dividing by the maximum value of L ($L_{max}$) for the image. Any negative values can be set to zero. pR2 is thus determined from the expression:

$$pR2=\max(0, L/L_{max}) \qquad \text{Eqn. 5}$$

Eqn. 5 thus serves to identify reddish pixels (as identified in the substep S14A) which have a low gray level. Eqn. 5 thus gives an indication of whether the pixel is more red than it is bright, which is generally the case for red-eyes. This eliminates a substantial portion of the false positives, e.g. on skin and face regions which present those characteristics.

In one embodiment, the output of subsstep S14B is thus a probability value pR2 for each pixel which takes into account the gray level V of the pixel and its redness D.

In the above example, where R=220, G=130, B=90, and if $L_{max}$ is 100

$$V=0.25*220+0.6*130+0.15*90=146.5$$

$$L=2*110-146.5=73.5$$

$$pR2=73.5/100=0.735$$

Alternatively, the pR2 value of a pixel can be determined according to the expression:

$$pR2=(R-LPF(R+G+B)/3)/255 \text{ or 0 if this is negative} \qquad \text{Eqn. 6}$$

where LPF denotes a low pass filter (for example, a 5×5 pixel square containing the pixel being evaluated). The average value of the R, G, and B values of the pixels in the low pass filter is thus divided by three and subtracted from the red value of the pixel. The result divided by the maximum value (255 in this case) to generate a value from 0 to 1.

The probability values pR1 and pR2 assigned in steps S14A and S14B are optionally combined into a single probability value pR, such as a product or weighted sum of pR1 and pR2 (substep S14C) which allows further processing to concentrate on the most probable red-eye regions. For example, a combined redness and redness/luminance probability F can be obtained as the product of pR1 and pR2 and then normalized by dividing by the maximum value of F ($F_{max}$) over the image, with negative values set to zero, as follows:

$$F=pR1*pR2 \qquad \text{Eqn. 7}$$

$$pR=\max(0, F/F_{max}) \qquad \text{Eqn. 8}$$

Eqn. 8 thus reinforces the probability where both pR1 and pR2 have large values and reduces/sets to zero the probability where either pR1 or pR2 are low/zero. pR can thus be considered as the probability of the pixel being in a red eye in the sense of being reddish and also more reddish than bright. The probability pR thus provides an approximation of the probability that the pixel is similar in color and luminance to pixels which are in a red-eye, in practice. The higher the value of pR, in general, the more likely it is that the pixel is in a red-eye. pR (or alternatively pR2 or pR1) constitutes the input for the circularity probability calculated in the next step (substep S14E).

In substep S14E, a circularity probability value pSC may be assigned to each pixel (or to pixels in any region 10 identified as comprising pixels with at least a minimum value of pR3, such as pR3>0 or pR3>0.1). One aspect of this substep is to ensure that each candidate red-eye is of circular shape and its width/height ratio is close to 1. The circularity probability value pSC of a pixel is thus related to the degree of circularity of a region in which the pixel is located. In one embodiment, the probability value pSC is computed on pR determined in substep S14C, above.

Figure 2:
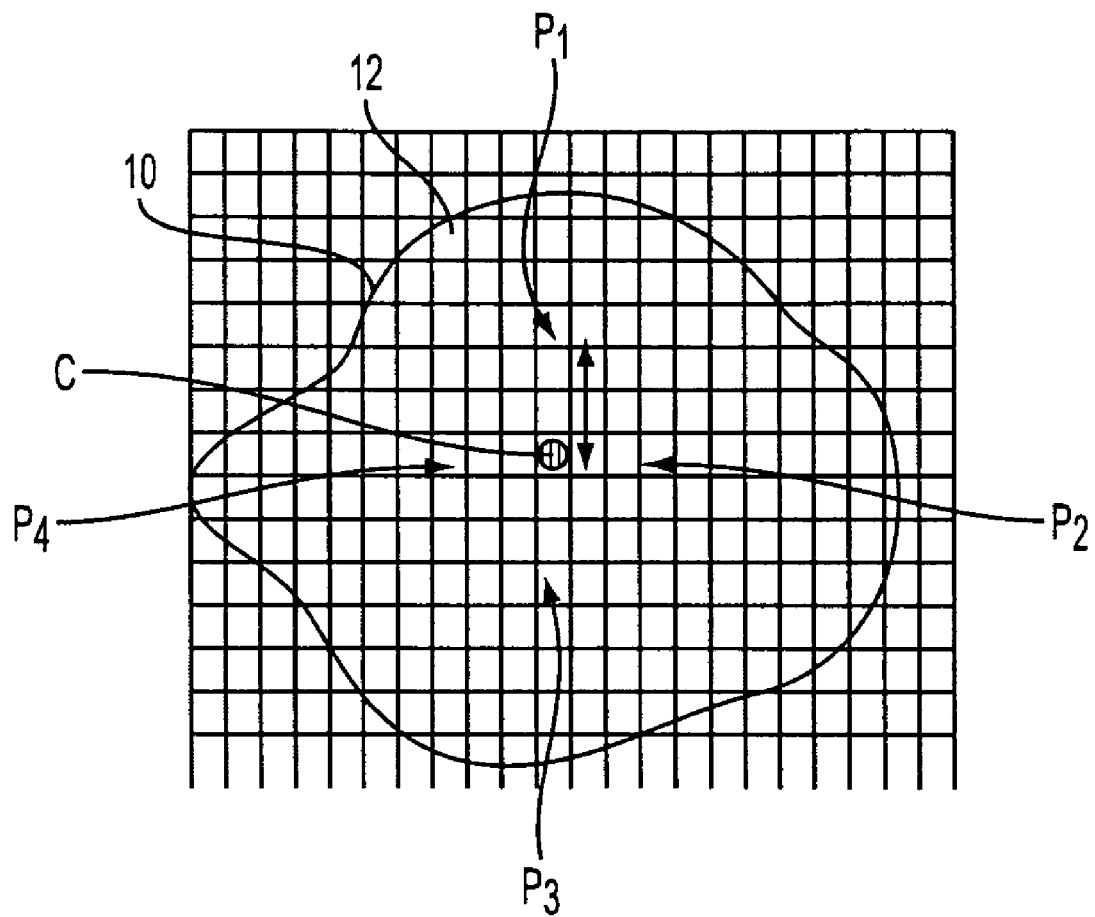
FIG. 2 is a schematic view of a portion of an image and a region surrounding a pixel to which a circularity probability is being assigned.

For example, as illustrated in FIG. 2, in substep S14E, a set S of pixels, P1, P2, P3, P4, etc., which are radially spaced by a selected distance r from the pixel C being evaluated and arcuately spaced an equal distance from each other, are selected. The set may include 4, 6, 8, or any convenient number of pixels. If each of the pixels P1, P2, P3, P4, etc in the set of pixels have an approximately equal pR probability, this suggests that the central pixel P has a high probability of being in a circular region. This is most significant at the perimeter 10 of the region 12 in which the pixel is located. By moving stepwise further away from the pixel and looking at a plurality of pixel sets of increasing radius, the circularity probabilities for each of these sets can be computed and an maximum probability, average probability, or other function which takes one or more of these into account can be determined. In one embodiment, a number of pixels $N_1, N_2 \ldots N_p$ (pixel count) at radius r and a circularity probability pSCr(C, r), is obtained for the central pixel C and the radius r, as the maximum, truncated if less than zero of the expression:

$$pSC(C,r)=\max(0, \tfrac{1}{2}*\text{PixelCount}*pR(C)-[pR(N_1)+ \ldots +pR(N_p)]) \qquad \text{Eqn. 9}$$

where PixelCount is the number of pixels selected on the circle around C.

For example, for four pixels N S E W of the central pixel, values of the expression $$pSC(C,r)=\tfrac{1}{2}*4*pR(C)-[pR(N_1)+ \ldots +pR(N_4)] \text{ are determined}$$

Values of pSC(C,r) are determined for different r values (e.g., seven sets of pixels at r values of 3, 5, 9, 13, 19, 23, 27 from the central pixel) are obtained. In one embodiment, the maximum value of pSC(C,r) over all considered radii pSC(C) is determined:

$$pSC(C)=\max(pSCr(C,r)) \qquad \text{Eqn. 10}$$

The value of pSC(C) is scaled, e.g., normalized by dividing pSC(C) by the maximum value of pSC(C) over the entire image (pSC(C)max) to determine a normalized probability pSC, and truncating where less than 0, as follows:

$$pSC = \max(0, pSC(C)/(pSC(C)_{max}))  \quad \text{Eqn. 11}$$

This assigns a high probability pSC to pixels having a high probability pR surrounded by a circle of pixels with low probability pR.

In an alternative embodiment, the values of pSC(C,r) are averaged to determine pSC(C).

It will be appreciated that fewer than four or more than eight pixels can be selected for each set S, and that the pixels selected need not be equally spaced arcuately. It is also contemplated that different radial distances can be selected, e.g., r can be from 1 to 100 pixels (which may depend on the resolution of the image under investigation) as well as different numbers of sets of pixels, e.g., from 2 to 20 sets of pixels, in one embodiment, from 3 to 10 sets.

Other measurements of circularity are also contemplated. In general, the determination of circularity probability pSC assigns pixels which are towards the center of a substantially circular area having a high local contrast (i.e., a surrounding area of substantially different color and/or brightness) at the perimeter, a probability pSC which is greater than zero and can be up to 1, the value generally increasing as the circularity increases. For those pixels which are not a part of a substantially circular area having a high local contrast at the perimeter, a probability pSC of zero or close to zero is assigned.

In one embodiment, the value of pSC is not determined for all pixels. For example, pSC is only determined for pixels where pR is greater than 0 or greater than a minimum threshold value, for example, greater than a normalized value of 0.1. In another embodiment, the same value of pSC can be used for a set of pixels which are directly adjacent or closely adjacent to a measured pixel. For example, a set of 3×3 or 5×5 pixels is assigned the value of pSC of the central pixel. This can reduce the computation time considerably without an appreciable reduction in accuracy.

In general, therefore, the assigned probability pSC takes into account some measure of the circularity of a region defined by its redness value pR of which the pixel forms a part. The probability may also take into account, directly or indirectly, the local contrast of the pixel and the extent to which the area in which the pixel is located is bounded by a substantially non-red area.

The output of substep S14E is a probability map of assigned values of pSC for each pixel in the image (or for pixels in those regions which meet a threshold value of pR3) (substep S14F).

Optionally, one or more further tests are performed to determine whether a red-eye correction is appropriate (Step S15). For example, these tests may evaluate those regions of contiguous pixels which have a minimum value of pSC (and/or pR) (Substeps S15A S15B) to determine whether they meet size and/or shape criteria. These tests are designed to eliminate false positives, i.e., regions of contiguous pixels where the pixels have a minimum value of pSC and yet which are not likely to be red-eyes, for example, because they are too large or too small in relation to the size of the image, or because they are too elongate or lack compactness. These tests are applied to regions comprising several pixels and are indicative of whether the region, as a whole, should be considered to be a red-eye and thus warrant a correction. The tests allow certain regions to be eliminated from consideration as red-eyes and for these, no correction is applied to the pixels in the region. For example if any of the tests is not met, the original redness value is kept and pR1, pR2, and/or pR3 is set to zero. In one embodiment, a region has to pass all the tests to be considered a red eye. If an area does not pass all the tests then the probability for all pixels within this area is set to 0 (and the original redness value is kept).

These tests may concern different characteristics of potential red-eye regions, and can be applied to the probability map (pSC values) or an intermediate probability map (e.g., pR, pR1, or pR2). In an illustrated embodiment, they are applied to pSC.

Figure 3:
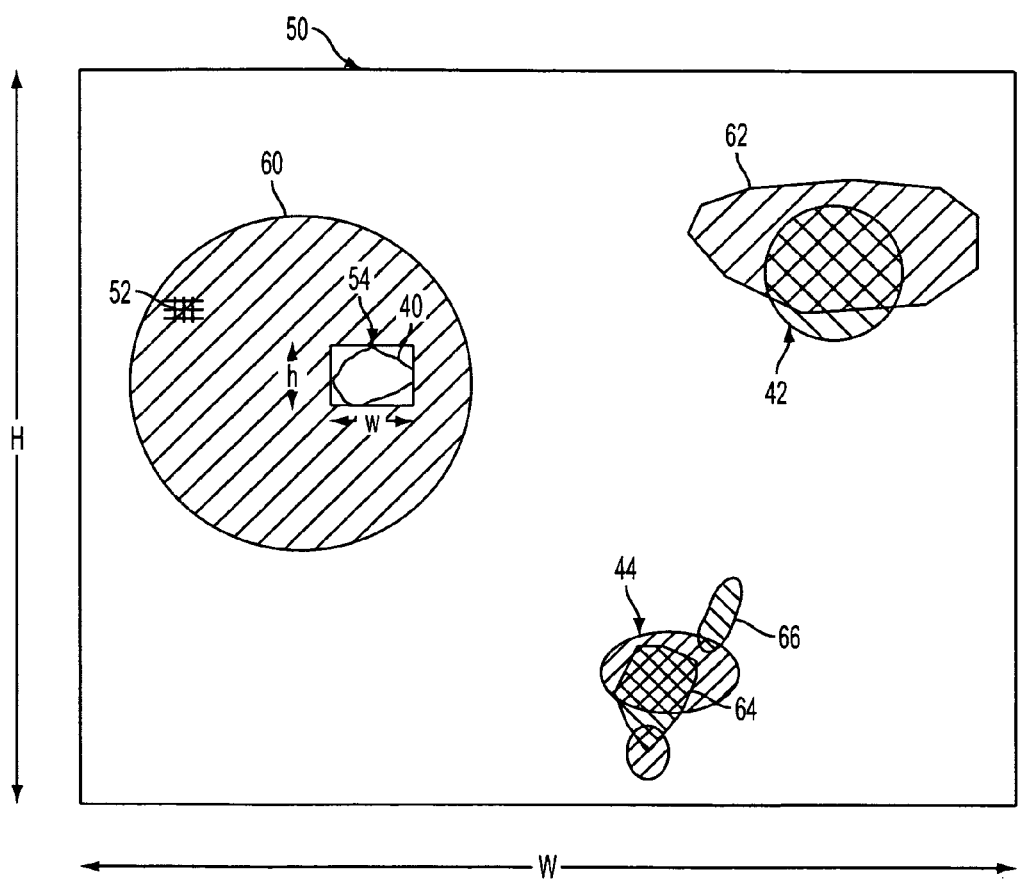
FIG. 3 is a schematic view of an image illustrating areas of consideration during red-eye detection.

As illustrated in FIG. 3, the potential red-eye regions 40, 42, 44 are identified as regions of connected pixels exceeding a threshold probability of pSC which is greater than 0 and less than 1. The threshold probability may be, for example, from about 0.05 to about 0.2, e.g., about 0.1. There may be several potential red-eye regions 40, 42, 44, in an image 50 which meet this threshold. For each of the regions 40, 42, 44, the width w and height of the region 40, 42, 44, are determined. The following tests are described with reference to region 40, although it will be appreciated that the tests are performed for each region 40, 42, 44 (or for each region which passes the preceding test or tests).

The size tests (substep S15A) may include a first size test on each of the individual regions to determine that the region 40 is not too small with respect to the whole image 50. In this test the maximum width w and maximum height of h of the region are determined, for example, in terms of the number of pixels. The test is satisfied if:

$$w > j/100 * s\text{Max} \quad \text{Eqn. 12}$$

and $$h > k/100 * s\text{Max} \quad \text{Eqn. 13}$$

where sMax is the maximum of the width and height of the image 50 in pixels: sMax=max(W,H), and
j and k independently can be, for example, from about 0.1 to about 0.5, e.g., about 0.25, e.g.,
w>0.25/100*sMax and
h>0.25/100*sMax If a region 40 does not meet this test, i.e., it is too small in relation to the image, it is not considered to be a red-eye.

A second size test on each of the individual regions 40 may be to determine that the region is not too big with respect to the whole image. Theis test is satisfied where:

$$w < t/100 * s\text{Min} \quad \text{Eqn. 14}$$

and $$h < u/100 * s\text{Min} \quad \text{Eqn. 15}$$

where sMin is the minimum of the width W and height H of the image in pixels: sMin=min(W, H); and
t and u independently can be, for example, from about 5 to about 20, e.g., about 10, e.g.,
w<10/100*sMin and
h<10/100*sMin If the region 40 does not meet this test, i.e., it is too large in relation to the image, it is not considered to be a red-eye.

The shape tests (substep S15B) can include a first shape test on each of the individual regions 40 to determine that the region is not too elongate, i.e., the height is not substantially greater than the width, and the width is not substantially greater than the height. This test is satisfied if:

$$w < y * h \quad \text{Eqn. 16}$$

and $$h < z * w \quad \text{Eqn. 17}$$

where y and z independently can be for example, from about 1.5 to about 3. For example the width is less than about twice the height, and the height is less than about twice the width: w<2*h; h<2*w.

If the region does not meet this test, i.e., it is too elongate in either the width or height direction, it is not considered to be a red-eye.

A second shape test on each of the individual regions 40 may be to determine that the region is relatively compact. This test is satisfied where:

$$fpb > f \qquad \text{Eqn. 18}$$

where fpb is the fraction of pixels 52 within the region's rectangular bounding box 54 belonging to the region 40 and f can be from about 0.1 to about 0.3, e.g. about 0.25.

If the region 40 does not meet this test, i.e., it is too disperse, it is not considered to be a red-eye.

The output of steps S15 is a probability map which assigns a probability value P=0 for every pixel except for those pixels in regions which have passed each of the applied tests. For the pixels in the regions which pass the tests, the assigned probability value P=pR2 is retained.

It will be appreciated that fewer or greater than the four tests described above may be applied, and that a region may be considered a red-eye if at fewer than all the tests are satisfied, e.g., if at least a minimum number of the tests is satisfied, such as two or three of the tests.

Additional tests may optionally be conducted to reduce false positives further. For example, a fifth test (S15C) determines whether a region identified in steps S15A and B as a potential red-eye (P>0) overlaps with a region of pixels having a high redness probability pR2 or pR1. As illustrated in FIG. 3, this test may include mapping any remaining probable red-eye regions 40, 42, 44, (i.e., those potential red-eye regions 40, 42, 44, which have not been eliminated in steps S15A and S15B above) and their probabilities from pSC onto the corresponding regions 60, 62, 64 in pR2. During this step, regions whose size changes too much between pR2 and pSC are eliminated, as for red-eye regions the size should only change by a limited factor.

In this step, each probable red-eye region 40, 42, 44, in pSC is first linked to the corresponding region 60, 62, 64, respectively, in pR2. For example, for each region 40, 42, 44 in pSC, all overlapping regions 60, 62, 64, 66 in pR2 are determined. Regions 60, 62, 64, 66 in pR2 are identified as connected regions of pixels exceeding a threshold pR2 probability. For example, the threshold pR2 probability can be ¼ of the mean value of the probability that pR2 assigned to the pixels belonging to the region in pSC, although values of greater or less than ¼ are also contemplated, such as from 0.2 to about 0.3. From all overlapping regions, 60, 62, 64, 66 then the one that overlaps most (in terms of numbers of pixels) is chosen as the corresponding region 60, 62, 64.

Then, the size of the regions 40, 42, 44 in pSC is compared with the size of the overlapping region 60, 62, 64 in pR2, respectively, to check that the regions are of comparable size. For example, for comparable regions 40, 60 the following test concerning the region size in number of pixels has to be passed:

$$np1 > \tfrac{1}{4} * np2 \qquad \text{Eqn. 19}$$

where np1 is the number of pixels in region 40 (pSC)
np2 is the number of pixels in the corresponding region 60 (pR2)

Similar tests are performed for each corresponding pair of regions, 42, 62 and 44, 64.

If this fifth test is passed, and if the pR2 region 62, 64, 66 meets the desired size and shape criteria (S15A, S15B) concerning the characteristics of possible red-eye regions, the pR2 region 62, 64, 66 is retained, together with its probability values P=pR2. After this step the probability map assigns a value of P=0 to every pixel except those in the region or regions selected from 62, 64, 66 corresponding to the corresponding red-eye regions from pR2 that passed the size and shape tests. Optionally, the pR2 values are then scaled, e.g., by normalizing, dividing the value of pR2 by the maximum value of pR2 ($pR2_{max}$) over the entire image:

$$P = pR2/pR2_{max} \qquad \text{Eqn. 20}$$

By way of example, in the image illustrated in FIG. 3, for region 40, the corresponding region 60 in pR2 is too large (the number of pixels in region 40 <¼ the number of pixels in region 60) and is thus eliminated—all pR2 values are set to 0 in region 40; i.e., for this region, P=0. For region 42, the corresponding region 62 in pR2 meets Eqn. 19 and thus region 42 probabilities are retained. For region 44, the corresponding region 64 has the greatest area of overlap with region 44 and thus region 44 is retained. Region 66, which is a region in pSc which overlaps with region 64 in pR2, has less of an overlap with region 44 than region 64, and thus does not play a part in the decision regarding region 44.

The next step (Step S16) is determining a red-eye correction for each pixel having a probability P of >0. In one embodiment, the higher the probability P, the greater the correction which is applied to the pixel. The correction can include increasing the blue and green components of the pixel and/or decreasing the red component of the pixel. In another embodiment, where a pixel has a probability P above a certain threshold, the red component of the pixel is set to zero.

For those pixels where a red-eye correction is to be made, the correction can take into account the color of the pixel, in terms of, for example, the red, green, and blue components of the pixel in question as well as the probability that the pixel is a red-eye pixel. This allows the saturation of the image to influence the correction and results in a correction which is more likely to reflect the saturation of surrounding areas.

For example, a red reduced value redReduced is assigned to the pixel which is a function of the green and blue values. For example, the red reduced value is an average of green and blue:

$$redReduced = (G+B)/2 \qquad \text{Eqn. 21}$$

The G and B values are kept the same. Thus, in the exemplary pixel where R=220, G=130, B=90, redReduced=110. The probability P of the pixel being a red-eye is used to determine the relative contributions of the original red value and the red reduced value to the final red value in the image. The higher the value of P, the greater the weight that is placed on the red-reduced value. For example, the corrected red value Rcorrected can be determined from the expression:

$$R\text{corrected} = (1-P)*\text{original} + P*(\text{redReduced}) \qquad \text{Eqn. 22}$$

Thus, for P=¼, in the illustrated pixel, $$R\text{corrected} = \tfrac{3}{4}*220 + \tfrac{1}{4}*110 = 192.5 = 193$$

The red value is thus reduced in the final image from 220 to about 193, while the original green and blue values are retained. Thus the modified pixel is R=193, G=130, B=90.

In another embodiment, the red value is adjusted by raising the P value to a power. The modification of a pixel can thus be based on the following equation:

$$R\text{corrected} = (1-P^{(1/\text{degree})})*R\text{original} + P^{(1/\text{degree})} * \text{redReduced} \qquad \text{Eqn. 23}$$

in which Roriginal is the red value of the input image, redReduced is the red-reduced value of R, and degree is an algorithm parameter controlling the respective weight of the original and the redReduced values. Degrees of integer values from 1 to about 4 generally give good performance. In equation 22 above, the degree is 1. It is also contemplated that P^(1/degree) may be considered as the probability rather than P itself, thus the equation can be considered as:

$$Rcorrected=(1-P))*Roriginal+P*redReduced \qquad \text{Eqn. 24}$$

Where the image being evaluated is a low resolution image of an original image, the pixels in the original image which correspond to a pixel of the low resolution image for which a P value has been determined are all corrected in this last step by calculating redReduced values for each corresponding pixel in the original image and applying the same value of P to determine Rcorrected for each of these corresponding pixels.

In one embodiment, a user input allows a user to view the red-eye corrected image and accept or decline the correction (Substep S16C).

Figure 4:
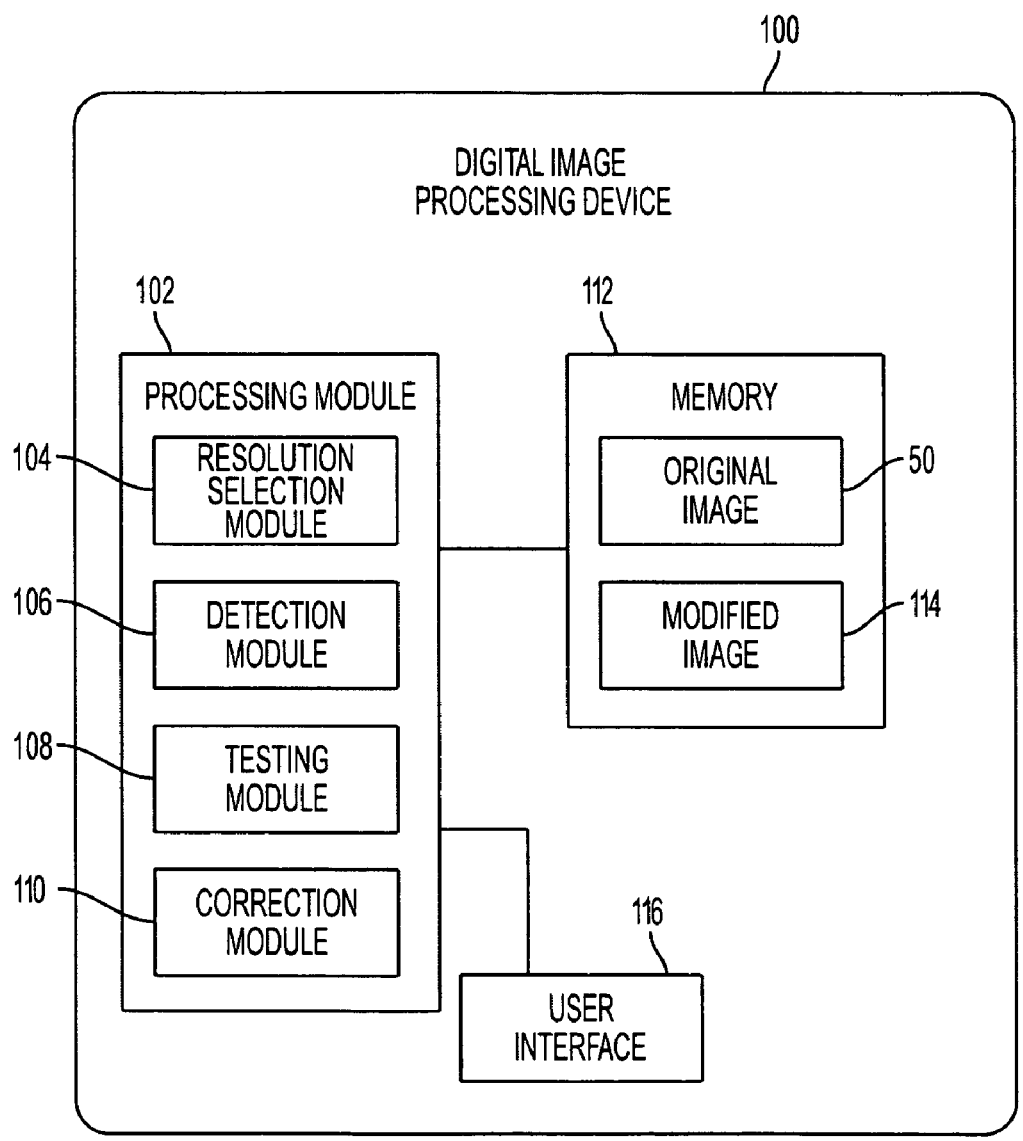
FIG. 4 is a schematic view of a digital device for performing the steps of FIG. 1.

The various steps for determining the probabilities and applying the correction can be incorporated into software as an algorithm which automatically evaluates images and applies red-eye correction. An exemplary digital imaging device or a digital image processing apparatus 100 incorporating processing modules 102 is shown schematically in FIG. 4. The processing modules include a resolution selection module 104 for determining the resolution of an image and generating a lower resolution image in step S12, if appropriate. The processing modules also include a detection module 106 which includes components for performing steps S14A, S14B, S14C, S14D, and S14E, a testing module 108 for applying tests S15A, S15B, and S15C, and a correction module 110 including components for performing steps S16A, S16B, and optionally step S16C. The digital device 100 includes suitable memory 112, accessed by the modules 102, for storing the outputs of the steps and the original and modified images. The processing modules may communicate with a user interface 116 which allows a user to view the corrected image and accept or decline the correction.

To test the efficiency of the methodology, an algorithm for performing steps S14, S15, and S16 can be implemented, for example, with Matlab™ software and tested on a set of images, such as a hundred images. In general, execution of the overall algorithm may take up to about 2 seconds for 512×512 color images (about 2.5 mega pixels), running on a Pentium 42.66 GHz PC (e.g., 1.7 seconds for detection and 0.1 seconds for correction), where circularity (pSC) is determined for all pixels. If pSC is computed for fewer than all pixels, a decrease in implementation time to about 0.2 seconds, or less can be achieved. The results of the methodology may be compared with visual observations of the images which assess whether the algorithm has correctly identified the red-eyes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A processing method comprising:
receiving a digital image into memory of an image processing apparatus;
for each of at least a preponderance of pixels of the digital image or a reduced pixel resolution digital image therefrom, determining a probability that the pixel is in a red-eye as a function of a color of the pixel;
for each of a plurality of the pixels, determining a correction to apply to the pixel which is a function of the determined probability (P) that the pixel is within a red-eye and a color of the pixel;
applying a correction to the digital image or reduced pixel resolution image based on the determined corrections; and
outputting the corrected digital image in a format suitable for viewing;
wherein the correction of the pixels includes replacing a red component value of pixels having a probability (P) of being in a red-eye of greater than zero with a corrected red component value; and
wherein the corrected red component value is derived from the expression:

$$Rcorrected=(1-P^{(1/degree)})*Roriginal+P^{(1/degree)}*redReduced,$$

where Roriginal is the red component value of the pixel, redReduced is an average of the green and blue component values of the pixel and degree is from about 1 to about 4.

2. The method of claim 1 wherein the probability of the pixel being in a red-eye is scaled over the digital image.

3. The method of claim 1, wherein the probability of the pixel being in a red-eye has a value of from 0 to a maximum value.

4. The method of claim 1, wherein the determining of the probability includes determining a redness probability which is a function of red, green, and blue components of the pixel.

5. The method of claim 4, wherein the probability that the pixel is in a red-eye is a function of the extent to which the pixel is more red than it is green and blue.

6. The method of claim 1, wherein the determining of the probability that the pixel is within a red-eye includes assigning a redness/luminance probability which is a function of the extent to which the pixel is more red than it is green and blue and also the extent to which the pixel is more red than bright.

7. The method of claim 6, wherein the assignment of the redness/luminance value for the pixel includes subtracting the mean of a pixel's green and blue component values from its red component value to determine a redness value and further reducing the redness value by subtracting a weighted sum of red, blue and green components of the pixel.

8. The method of claim 1, wherein a plurality of the pixels in the image are assigned a probability of the pixel being in a red-eye of between 0 and 1.

9. The method of claim 1, further comprising:
determining the correction to apply to pixels in the digital image which, for each of the pixels, is a function of the assigned probability that the corresponding pixel in the reduced pixel resolution image is within a red-eye and the color of the pixel in the digital image.

10. A processing method comprising:
receiving a digital image into computer memory;
using a computer, determining a probability for each pixel of the entire image that the pixel is in a red-eye as a function of a color of the pixel;
thereafter, based on the determined probabilities, identifying any regions in the image of contiguous pixels which satisfy at least one test for a red-eye, the at least one test relating to one of the group consisting of a size of the region, a shape of the region, and an extent of overlap with a region comprising pixels having at least a threshold determined probability of being in a red-eye; and for each of the plurality of pixels in an identified region, determining the correction to apply to the pixel which is a function of the determined probability that the pixel is within a red-eye and the color of the pixel;

applying a correction to pixels of the digital image based on the determined correction; and wherein the correction of the pixels includes replacing a red component value of the pixels having a probability (P) of being in a red-eye of greater than zero with a corrected red component value; and wherein the corrected red component value is derived from the expression:

$$R\text{corrected}=(1-P^{\wedge}(1/\text{degree}))*R\text{original}+P^{\wedge}(1/\text{degree})*\text{redReduced},$$

where Roriginal is the red component value of the pixel, redReduced is an average of the green and blue component values of the pixel and degree is from about 1 to about 4.

11. The method of claim 10, wherein the identification of regions includes identifying pixels which meet a spatial characteristic, the spatial characteristic being related to a degree of circularity of a contiguous region in which the pixel is located; and identifying any regions within the image comprising contiguous pixels which are identified as meeting the spatial characteristic.

12. The method of claim 10, wherein the method includes determining probability values for a plurality of sets of pixels, each set of pixels lying on a circle which is centered on the pixel and having a different radius.

13. The method of claim 10, wherein the pixels in regions which do not satisfy the at least one test are assigned a probability that the pixel is in a red-eye of 0.

14. The method of claim 10, wherein the at least one test for a red-eye evaluates a size of the region in relation to a size of the digital image.

15. The method of claim 10, wherein the at least one test for a red-eye evaluates at least one of an extent to which the region is compact and an extent to which the region has equal height and width.

16. The method of claim 10, wherein the determining of the probability to the pixels, the identifying of regions in the image of contiguous pixels which satisfy at least one test for a red-eye, and the determining a correction to apply to the pixels is performed automatically.

17. The processing method of claim 10, further comprising outputting the corrected digital image in a format suitable for viewing.

18. A computer system for correction of images comprising:

a computer processing module including:

a detection module which, for each of at least a preponderance of pixels in an optionally reduced pixel resolution digital image, determines a probability that a pixel is within a red-eye as a function of a color of the pixel, the probability having a value which is variable from a minimum value to maximum value;

a module which determines whether a region in which a pixel is located meets at least one test for being a red-eye based on the determined probabilities of the pixels;

a correction module which determines a correction to apply to the pixels in regions that meet the at least one test, the correction being a function of the determined probability and of a color of the pixel;

memory, which stores the digital image that is processed by the modules;

wherein the correction of the pixels includes replacing a red component value of the pixels having a probability (P) of being in a red-eye of greater than zero with a corrected red component value; and wherein the corrected red component value is derived from the expression:

$$R\text{corrected}=(1-P^{\wedge}(1/\text{degree}))*R\text{original}+P^{\wedge}(1/\text{degree})*\text{red Reduced},$$

where Roriginal is the red component value of the pixel, red Reduced is an average of the green and blue component values of the pixel and degree is from about 1 to about 4.

19. The system of claim 18, wherein the detection module further comprises a component which assigns a circularity probability to each of a plurality of the pixels.

20. The system of claim 18, further comprising:

a user interface which allows a user to view the corrected image and accept or decline the correction.

21. A processing method comprising:

storing a digital image or a reduced pixel resolution digital image therefrom in memory;

using a computer, for each of at least a preponderance of pixels of the digital image or the reduced resolution digital image, automatically determining a probability of the pixel being in a red-eye as a function of a color of the pixel;

based on the determined probabilities, identifying any regions in the digital image or the reduced pixel resolution digital image of contiguous pixels which satisfy at least one test for a red-eye, the at least one test relating to one of the group consisting of a size of the region, a shape of the region, and an extent of overlap with a region comprising pixels having at least a threshold probability of being in a red-eye;

for each of the plurality of pixels in an identified region, automatically determining the correction to apply to the pixel which is a function of the assigned probability that the pixel is within a red-eye and the color of the pixel;

applying a correction to pixels of the digital image based on the determined correction; and wherein the correction of the pixels includes replacing a red component value of the pixels having a probability (P) of being in a red-eye of greater than zero with a corrected red component value; and wherein the corrected red component value is derived from the expression:

$$R\text{corrected}=(1-P^{\wedge}(1/\text{degree}))*R\text{original}+P^{\wedge}(1/\text{degree})*\text{redReduced},$$

where Roriginal is the red component value of the pixel, redReduced is an average of the green and blue component values of the pixel and degree is from about 1 to about 4.

22. The processing method of claim 21, further comprising outputting the corrected digital image in a format suitable for viewing.

23. A processing method comprising:

storing an optionally reduced pixel resolution digital image into memory;

using a computer, for each of at least a preponderance of pixels of a digital image, assigning a probability to the pixel of the pixel being in a red-eye as a function of a color of the pixel, the probabilities varying between maximum and minimum values;

generating a probability map of the assigned probabilities for the entire image;

identifying regions of the image which have at least a minimum probability of being a red-eye, based on the assigned probabilities;

computing a circularity probability value of the pixels in the identified regions which is related to the degree of circularity of a region in which the pixel is located;

applying one or more tests to the regions to eliminate false positive regions; and for each of the plurality of pixels in at least the regions remaining after elimination of the false positive regions, determining a correction to apply to the pixel which is a function of the assigned probability that the pixel is within a red-eye and a color of the pixel;

applying a correction to pixels of the digital image based on the determined correction; and wherein the correction of the pixels includes replacing a red component value of the pixels having a probability (P) of being in a red-eye of greater than zero with a corrected red component value; and wherein the corrected red component value is derived from the expression:

$$R\text{corrected}=(1-P^{\wedge}(1/\text{degree}))*R\text{original}+P^{\wedge}(1/\text{degree})*\text{redReduced},$$

where Roriginal is the red component value of the pixel, redReduced is an average of the green and blue component values of the pixel and degree is from about 1 to about 4.

24. The processing method of claim 23, further comprising outputting the corrected digital image in a format suitable for viewing.

* * * * *